(12) United States Patent
Krauter

(10) Patent No.: US 7,401,537 B1
(45) Date of Patent: Jul. 22, 2008

(54) CUTTER INSERT GUM MODIFICATION METHOD AND APPARATUS

(76) Inventor: David Krauter, 1609 S. Central Ave., Kent, WA (US) 98032

( * ) Notice: Subject to any disclaimer, the term of this patent is extended or adjusted under 35 U.S.C. 154(b) by 270 days.

(21) Appl. No.: 11/088,397

(22) Filed: Mar. 23, 2005

Related U.S. Application Data

(60) Provisional application No. 60/555,849, filed on Mar. 23, 2004.

(51) Int. Cl.
B21K 5/00 (2006.01)
B21K 5/04 (2006.01)

(52) U.S. Cl. .................. 76/115; 76/108.1; 76/108.2; 148/903; 148/905

(58) Field of Classification Search ................. 76/115, 76/108.2, DIG. 11, DIG. 12; 148/16.5, 152, 148/903, 905
See application file for complete search history.

(56) References Cited

U.S. PATENT DOCUMENTS

| 4,303,137 | A | * | 12/1981 | Fischer ................ 175/374 |
|---|---|---|---|---|
| 4,460,053 | A | | 7/1984 | Jurgens et al. |
| 4,618,269 | A | | 10/1986 | Badrak et al. |
| 4,679,640 | A | | 7/1987 | Crawford |
| 4,781,770 | A | * | 11/1988 | Kar ................ 148/220 |
| 4,969,378 | A | | 11/1990 | Lu et al. |
| 5,234,064 | A | | 8/1993 | Lenaburg |
| 5,291,807 | A | | 3/1994 | Vanderford et al. |
| 5,580,472 | A | | 12/1996 | Maybon |
| 5,755,299 | A | * | 5/1998 | Langford et al. ........... 175/375 |
| 5,785,135 | A | | 7/1998 | Crawley |
| 5,836,531 | A | * | 11/1998 | Maybon ................ 241/296 |
| 6,196,338 | B1 | | 3/2001 | Slaughter et al. |
| 6,248,149 | B1 | | 6/2001 | Massey et al. |
| 6,564,884 | B2 | | 5/2003 | Bird |
| 6,601,475 | B2 | | 8/2003 | Davies et al. |
| 6,651,756 | B1 | | 11/2003 | Costo et al. |

\* cited by examiner

*Primary Examiner*—Joseph J. Hail, III
*Assistant Examiner*—Alvin J. Grant
(74) *Attorney, Agent, or Firm*—Michael F. Hughes; Hughes Law Firm, PLLC

(57) ABSTRACT

A method and apparatus for treating a cutter ring adapted to be used in tunnel boring operations; forming an initial cutter ring and heat treating the cutter ring prior to a laser client process; applying an alloy to the surface of the cutter ring adjacent to cutting elements by a laser cladding process whereby the cutting elements have insufficient heat transfer from the laser cutting process to reduce their hardness properties.

24 Claims, 7 Drawing Sheets

CUTTER INSERT GUM MODIFICATION METHOD AND APPARATUS

RELATED APPLICATIONS

This application claims priority benefit of U.S. Ser. No. 60/555,849, filed Mar. 23, 2004.

BACKGROUND OF THE INVENTION a) Field of the Invention

The disclosure is generally related to applying laser cladding to the cutting structure of replaceable rings and "monoblock" assemblies.

b) Background Art

Tunnel boring machines often use rolling disc type cutters on the front of their cutter heads to break and remove hard materials such as solid rock and embedded boulders. In certain instances it is advantageous to use cutting structures comprised of a plurality of hard buttons referred to as tungsten carbide Inserts (TCIs) which are cutting elements made usually of tungsten carbide and Cobalt in various relative concentrations embedded into a surrounding softer steel matrix. The TCI cutters stay sharper, longer than conventional cutter discs comprised only of steel. In order to more easily and economically drill a hole in the steel matrix for the TCI button, the hardness of the steel is limited to around 43 Rockwell Hardness maximum. Due to its relative softness, the material surrounding the button (the matrix) is worn away much faster than the TCI button. This differential wear causes the buttons to become exposed and the support offered by the matrix erodes and eventually the buttons fall out in the course of operation. This is colloquially referred to as "gingivitis" because the "gums" (matrix) supporting the "teeth" (TCI buttons) wear down and the teeth get knocked out.

Therefore, it is an objective to address this erosion problem by accurately applying an abrasive resistant material around and between the buttons. It is hoped this layer will prevent the deterioration of the "gums" and allow the TCI cutter to survive longer. In one form the layer is applied using a laser cladding process.

In the past manually applied hard facing has been applied to the flanks of TCI button cutting structure with unsatisfactory results. The manual process has lacked sufficient accuracy for localized heat application to apply material close to the button where the protection is most needed. The manual process also applies much more heat to the substrate than laser cladding such that the TCI buttons fell out or cracks ensue because the material became excessively brittle for the operating environment. Therefore, it is proposed that laser cladding allows the life of the TCI button cutter to be greatly extended.

SUMMARY OF THE DISCLOSURE

The disclosure below recites a method and apparatus for providing a cutter ring having a perimeter region with a plurality of radially extending cavities with cutting elements fixedly positioned therein. The ring has a gum region that frictionally engages the cutting elements. The gum region has a surface region with a hardened layer cladded to the surface region where the hardened layer is cladded to the surface region when the cutter ring is preheated above 350° F. Heat is applied to an alloy powder to form the hardened layer whereby there is insufficient heat transfer to the cutting elements to affect the metallurgical hardness properties of the cutting elements. In general, the hardened layer and the cutting elements have a Rockwell hardness at least 20 units greater than the gum region.

The method of treating a cutter ring described above in general first comprises providing a cutter ring that is heat treated with a circumferential region defining a plurality of cavities adapted to receive cutting elements. Then cutting elements are inserted into the cavity regions. The ring is then heat treated by heating the cutter ring to approximately 350° F.-650° F. Thereafter a laser cladding process is conducted whereby an alloy powder is applied to a cutter ring perimeter surface adjacent to the cutting elements.

DETAILED DESCRIPTION OF THE PREFERRED EMBODIMENTS

Figure 1:
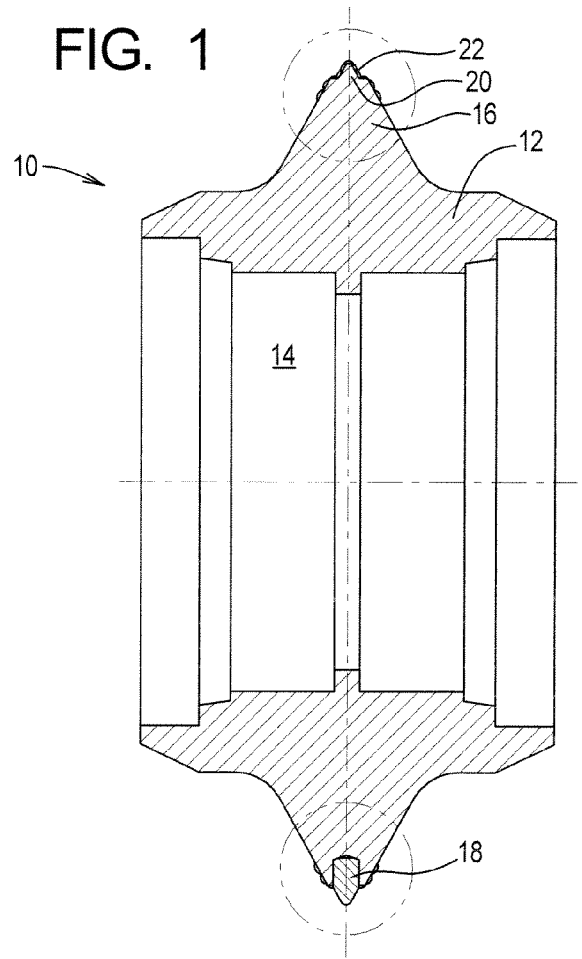
FIG. 1 shows a cross sectional view of the cutter assembly's cutting structure.
Figure 2:
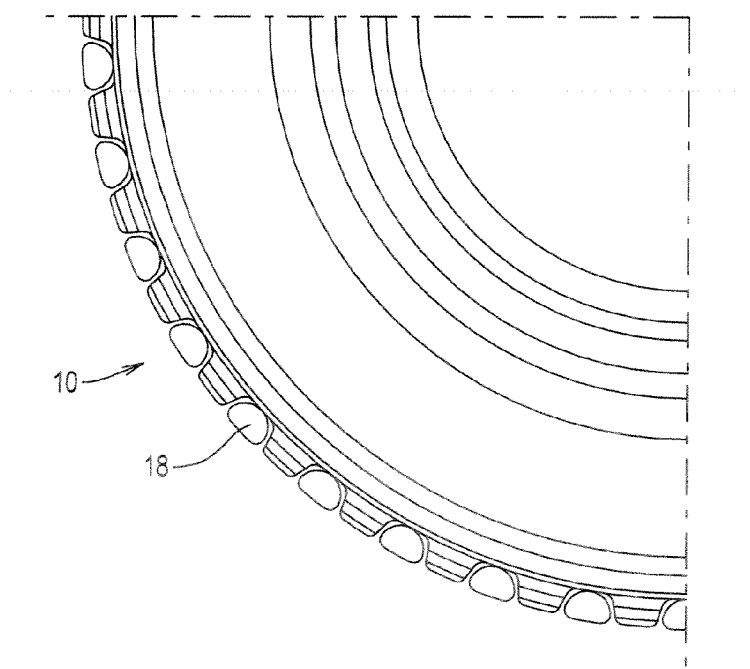
FIG. 2 shows a portion of a cutter ring along the longitudinal axis

As shown in FIG. 1 there is a portion of the cutter assembly 10 where an integral cutter ring 12 is shown in a cross sectional view. The cutter ring 12 has an interior region 14 and a circumferential region 16. As shown in the lower portion of FIG. 1, cutting elements 18 are inserted at spaced locations around the circumferential region 16. As shown in the upper portion of FIG. 1, the circumferential region 16 further has a gum region 20 which is defined as the material surrounding the cutting elements 18. The gum region 20 as shown in FIG. 2 is defined as the material that is adapted to hold the cutting elements therein and is further described below. In the most common form the cutting elements are pressed fit in to a cavity region of the gum region 20 to form an interference fit. The gum region 20 further comprises a surface region 22. It has been found that providing a surface to the gum area that has a sufficient hardness to reduce the amount of wear is advantageous and prevents gum erosion whereby the surrounding support material is eroded causing the cutter inserts 18 to fall out in application. Therefore, the surface region 22 is hardened in a localized manner by application of a laser clad material a thickness between 30 thousands to ⅛ of an inch in a broad range and preferably about 1/16 of an inch in thickness. Of course the hardened layer could be thicker up to a quarter of an inch and even thicker in some applications as required.

Therefore, in one form of manufacture of the cutter ring 12, raw material is provided and the raw material is rough machined to create the center bore and sides to get the basic cross-sectional shape. Thereafter, the raw ring 12 is heat treated and then a plurality of holes are drilled along the circumferential region 16 to provide cavities adapted to receive the cutter inserts 18. Normally, the Rockwell hardness of the cutter ring 12 at this stage in the manufacture process is approximately 32 to 44 (42-43 in the preferred range) Rockwell (Rockwell C scale) in the broader range so the aforementioned holes can be drilled out in an economical manner.

Figure 4:
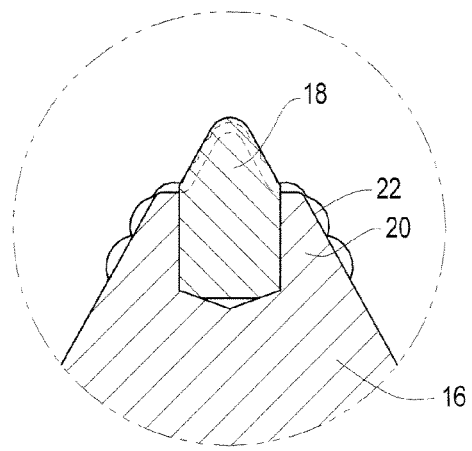
FIG. 4 shows a portion of the gum region along the outer circumferential region of the cutter ring that is interposed between two adjacent cutting element inserts.

Thereafter, the cutting elements 18 are inserted in the cavity regions of the perimeter region 16. In general, the cutting elements 18 are press fitted in the regions to provide an interference fit between the perimeter region 16 and the cutting elements 18. As shown in FIG. 4, the portion of the material in the perimeter region 16 that holds the cutting elements 18 therein is defined as the gum region 20 mentioned above.

Thereafter, the entire assembly is preheated to approximately 350° F. to 650° F. and a laser cladding process is then applied to the gum region 20. There will now be a description of the laser cladding process with initial reference to FIG. 5. It has been found that heating the cutter ring 12 to above 650° runs the risk of having the cutting elements 18 fall out because of the thermal expansion of the cutter ring.

Further, it is advantageous to preheat the cutter ring and derive the metallurgical advantages prior to application of the laser cladding process because the laser cladded hardened layer tends to act as a thermal insulator to some degree, which inhibits subsequent heating of the gum region 20. Therefore, preheating the gum region 20 of the cutter ring 12 (or in fact in general the entire cutter ring 12 and cutting elements 18 are heated as well) has the benefit of the desired metallurgical treating of the gum region properly where it can be slow cooled after the application of hardened cladded layer.

Figure 5:
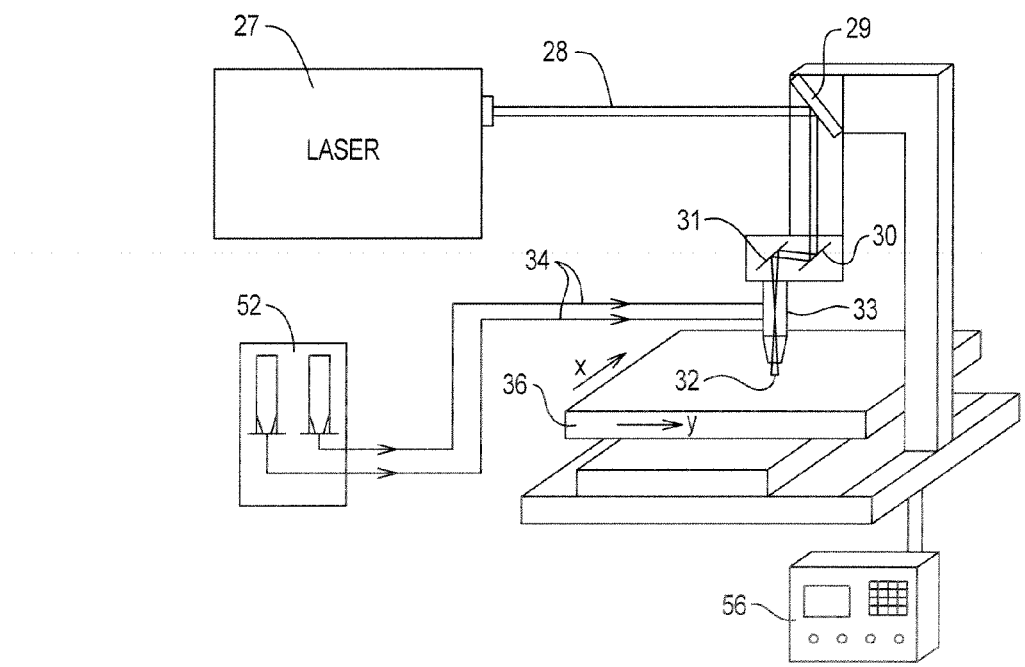
FIG. 5 shows a laser cladding device for implementing the present invention.

FIG. 5 is a schematic representation of a laser cladding installation which can be used in implementing the invention. This installation comprises a power laser 27 producing a beam 28 of coherent and monochromatic light. The beam 28 propagates in one direction only, homogeneously, and has only one wavelength. In general there is very little divergence of the beam.

In one form a set of mirrors 29 and 30 are provided to direct the beam onto a focusing head 31. The focusing head 31 directs the laser beam onto the surface to be resurfaced of the cutter ring 12. The focusing head 31 is adapted to focus the laser beam so that the latter impinges on the cutter ring (not shown) in a small impact area 32 where in one form the area is a diameter between about 0.5 and 5 millimeters where the cutter ring is to be positioned. A hemispheric dome shape cutting element 18 is one form where the hard facing can be applied circumferentially around each button instead of going around the ring cutter 12.

A powder dispenser 52 constitutes a reservoir holding a powdered material for laser cladding the cutter ring 12. This powder contains grains of hard abrasion resistant material which remain solid when exposed to the laser beam and grains of brazing alloy which melt when exposed to the laser beam. In one form powder used is produced by Technogenia S.A.™ of France as disclosed in U.S. Pat. Nos. 6,248,149 and 5,580,472 that are hereby incorporated by reference.

The powder dispenser 52 is adapted to fluidize the powder by means of a neutral gas such as argon or helium and to convey it pneumatically to a spray nozzle 33 via powder feed lines 34. The spray nozzle 33 is adapted to shape the fluidized powder leaving the nozzle into a convergent jet impinging on the same impact area 32 on the cutter ring 12. The fluidized powder jet leaving the nozzle must be as closely as possible coincident with the shape of the laser beam 28 in this area.

The powder dispenser 52 is of a type in which the mass flowrate of powder can be precisely controlled, in order to achieve excellent reproducibility and perfect regularity of the flow rate, which parameters have a direct influence on the regularity and the quality of the resulting resurfacing.

The laser beam impinges on the surface of the gum region 30 to be resurfaced close to the vertical. The outlet orifice of the nozzle 33 is maintained at a constant distance of approximately 10-40 millimeters from the surface to be resurfaced in one form.

The cutter ring 12 is placed on a table 35 which is moved horizontally in two directions X and Y by drive means controlled by a numerical controller 56. This causes the area of impact 32 of the laser beam and of the powder leaving the spray nozzle 33 to be scanned over the surface of the gum region 20 to be resurfaced. In one form this is accomplished by rotating the ring 12 about an axis and not necessarily with an x-y table.

Figure 6:
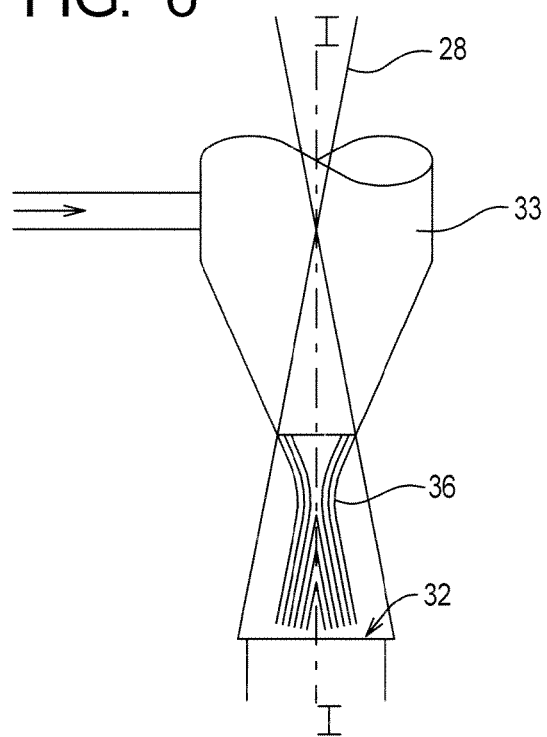
FIG. 6 is a schematic view showing a nozzle for injecting powder coaxial with the laser beam.

In the embodiment shown in FIG. 6 the spray nozzle 33 is of a first type which sprays coaxially with the axis I-I of the laser beam 28. The fluidized powder moves in a helix coaxial with the laser beam 28 and the powder jet 36 is concentrated in order to concentrate the area of impact of the powder onto the area of impact 32 of the laser beam 28 on the surface region 22 to be resurfaced. This impact area 32 is positioned at the surface region 22 as shown in FIG. 4.

Figure 7:
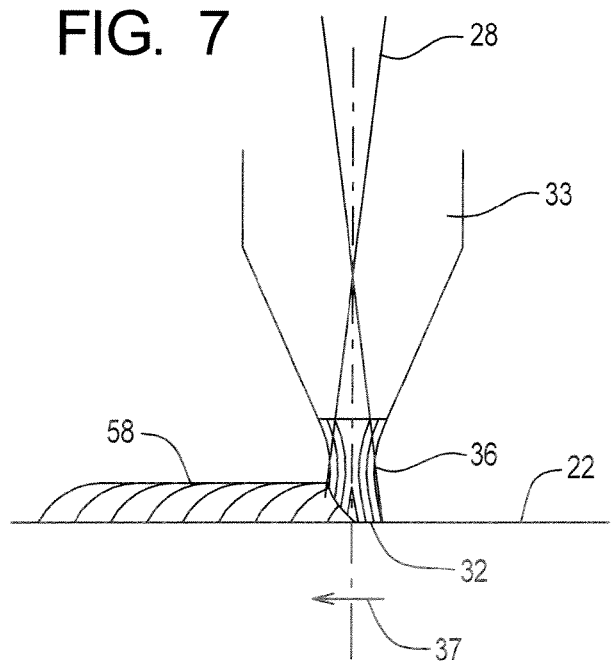
FIG. 7 shows the displacement of the coaxial nozzle and the laser beam for resurfacing a surface region in accordance with the invention.

FIG. 7 shows progressive laser cladding by displacement of the cutter ring 12 in the direction 37. The area of impact 32 of the laser beam 28 melts the brazing alloy powder, which is brazed to the surface region 22, binding the grains of abrasion resistant material thereupon and, after cooling, progressively forming a deposit 58 on the top of the ridge being resurfaced.

Figure 8:
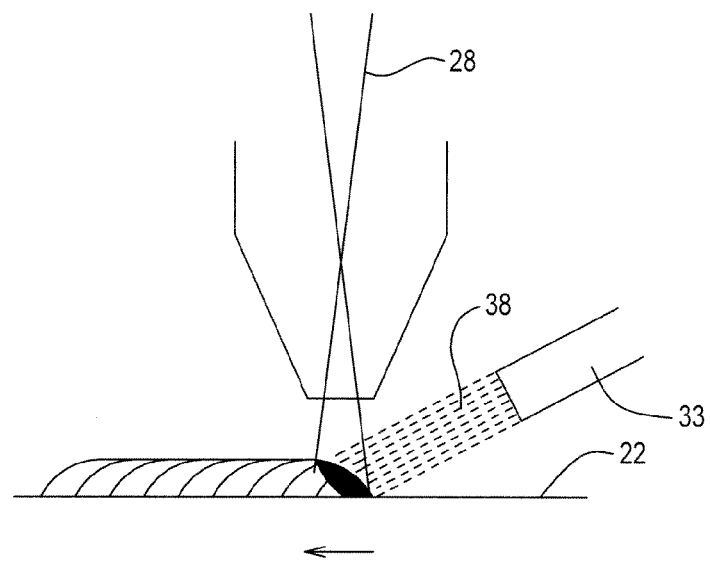
FIG. 8 and FIG. 9 show the displacement of a lateral nozzle and the associated laser beam in a different embodiment of the invention.

In the embodiment shown in FIG. 8, the spray nozzle 33 is a lateral spray nozzle which sprays the powder at a given angle to the laser beam 28. The powder jet 38 is preferably in the vertical plane through the surface region 22 to be resurfaced. The cutter ring 10 is scanned longitudinally in alternate directions, as shown in FIG. 8.

Figure 9:
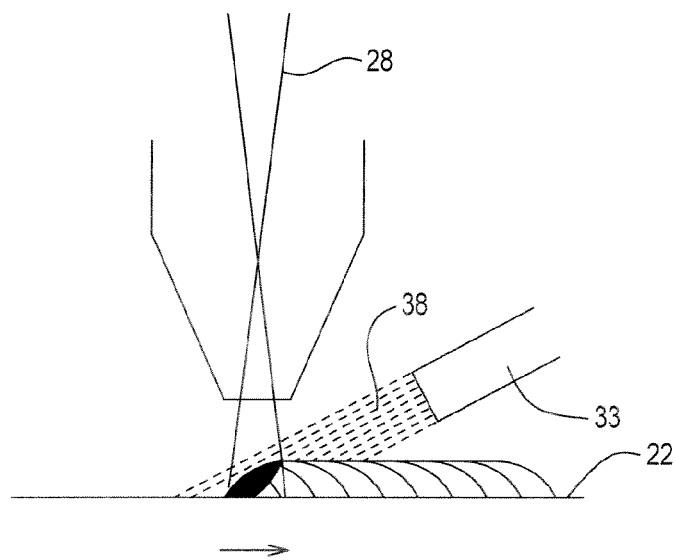

As shown in FIG. 9 the spray nozzle 33 is directing the powder at a given angle to the laser beam 28 on the surface region 22 that is interposed between two adjacent cutting elements 18 along the perimeter outer edge of the cutter ring 12.

The energy of the laser beam 28 melts the surface of the surface region 22 in the area of impact 32 and melts the brazing alloy powder. The powder therefore impinges partly melted on the surface of the surface region 22. The alloy powder is trapped on the surface and melts further during interaction of the laser beam 28 with the surface region 22, so forming a deposit.

Figure 10:
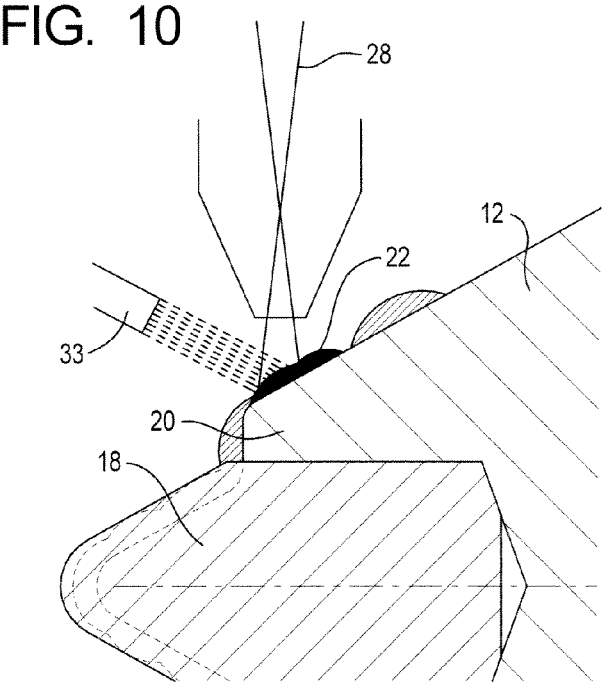
FIG. 10 shows the successive stages of cladding a surface region of a cutter ring in accordance with the invention in cross-section through the button.

FIG. 10 shows a schematic representation where the laser beam 28 has a focused distribution of light energy and the spray nozzle 33 is ejecting the powder substrate to the surface region 22 which is forming a hardened layer. It should be noted that the laser 28 provides a very localized heat increase whereby the cutting element 18 is not overheated and losing its material properties. It has been found that tungsten carbide degrades when the temperature reaches 900-1100 Fahrenheit. It has been found that the heat transfer to the cutting element 18 is minimal from the laser 28 whereby the cutting element 18 maintains its mechanical properties to function properly in a tunnel boring operation.

Figure 11:
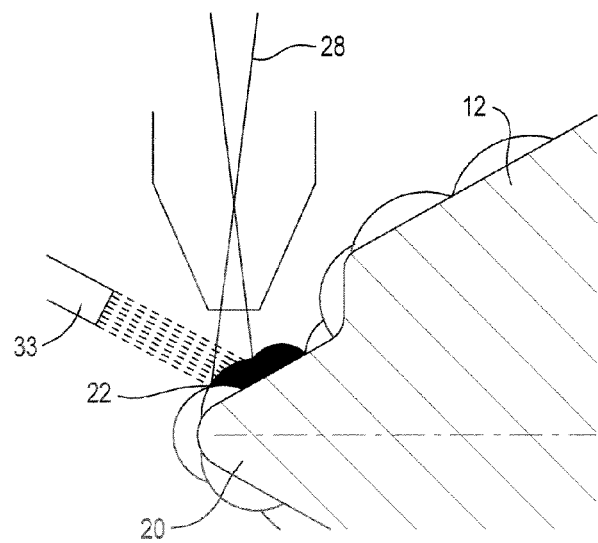
FIG. 11 shows the internal structure of a gum region resurfaced in accordance with the invention, after machining and in transverse cross-section between the buttons.

FIG. 11 shows the laser cladding process occurring at the gum region 20 at the portion of the surface region 22 interposed between two cutting elements (not shown) on the circumferential ring portion. It is advantageous to harden this area to prevent erosive wear between two adjacent cutting elements.

To match the resurfacing exactly to the upper surface of the ridges, the laser beam has to be controlled so that the area of impact 32 has a diameter substantially equal to the width of the ridge to be resurfaced.

The thickness of the deposit is between 30 thousands to ⅛ of an inch in a single pass. The processing speed can be from a few centimeters per minute to a few meters per minute, depending on the power of the laser 27. A ridge can be resurfaced in a single pass if the thickness of the deposit is a sufficient height.

After the laser cladding is applied no additional machining is needed to be performed. Within the surface region 22 there are no defects in homogeneity caused by formation of the multilayer deposit. The distribution of the hard abrasion resistant material, such as tungsten carbide, grains is uniform within the metal matrix, regardless of the number of layers deposited.

Figure 12:
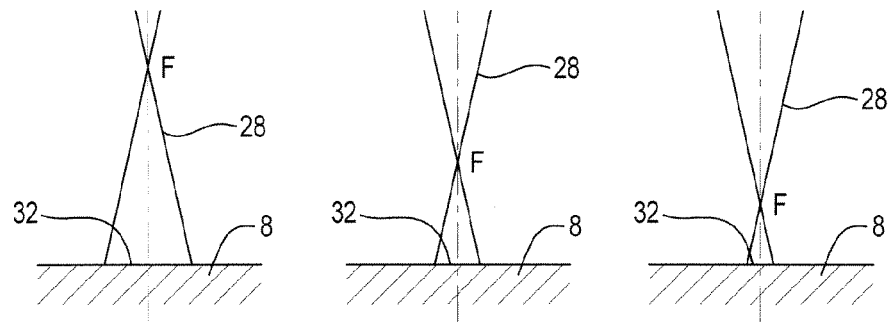
FIG. 12 shows the movement of the focus of the laser beam in a first embodiment of the invention.

FIG. 12 shows a first method of adjusting the laser beam 28, with a focus F above the cutter ring 10 to be resurfaced. By varying the distance between the focus F and the surface of the cutter ring 10 to be resurfaced the diameter of the area of impact 32 of the layer beam 28 can be varied, as shown in the figure.

Figure 13:
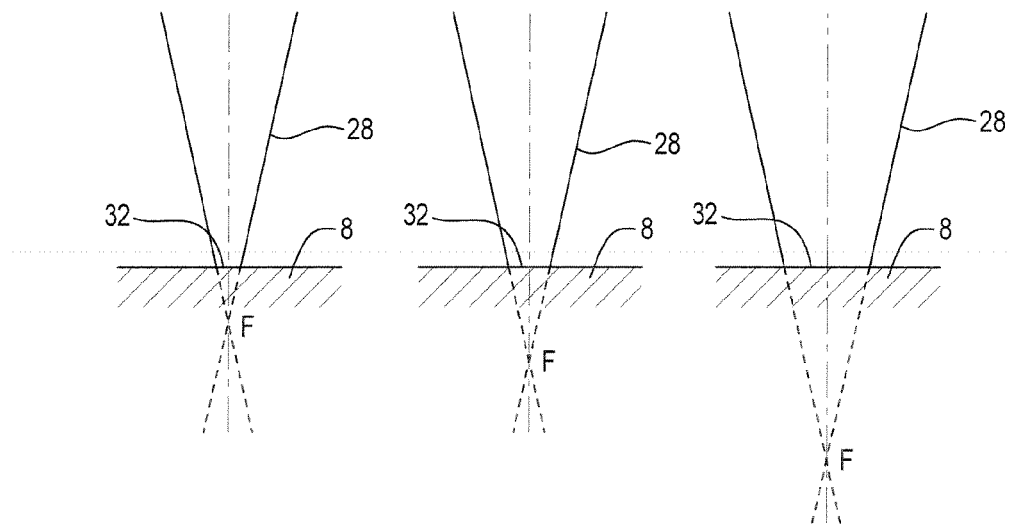
FIG. 13 shows the movement of the focus of the laser beam in a second embodiment of the invention.

FIG. 13 shows a second method of adjusting the laser beam 28. In this second method the focus F is below the surface of the cutter ring 10 to be resurfaced and varying the distance of the focus F from the surface of the cutter ring 10 also varies the size of the impact area 32 of the laser beam 28.

At each 180° turn the position of the focus F is modified to compensate for the height of the deposit previously formed, and thus to maintain a constant diameter of the impact area 32.

The method in accordance with the invention has the advantage of accurate reproduction of the geometrical shape of the resurfaced ridges. The surface region 22 is affected minimally by the heating effect of the laser beam during cladding and its distortion due to thermal expansion is thus extremely small or even negligible.

Figure 3:
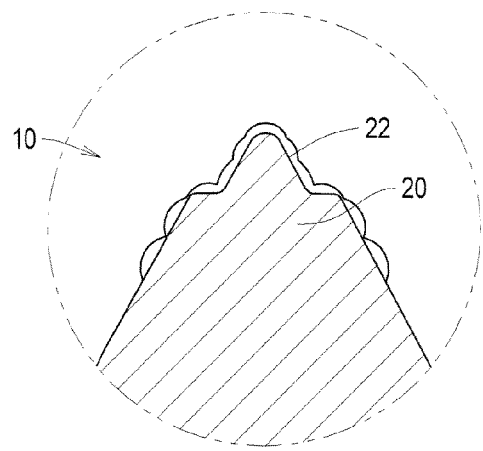
FIG. 3 shows a portion of the gum region on the circumferential portion of the cutter ring with a cutting element insert shown in cross-section.
Figure 14:
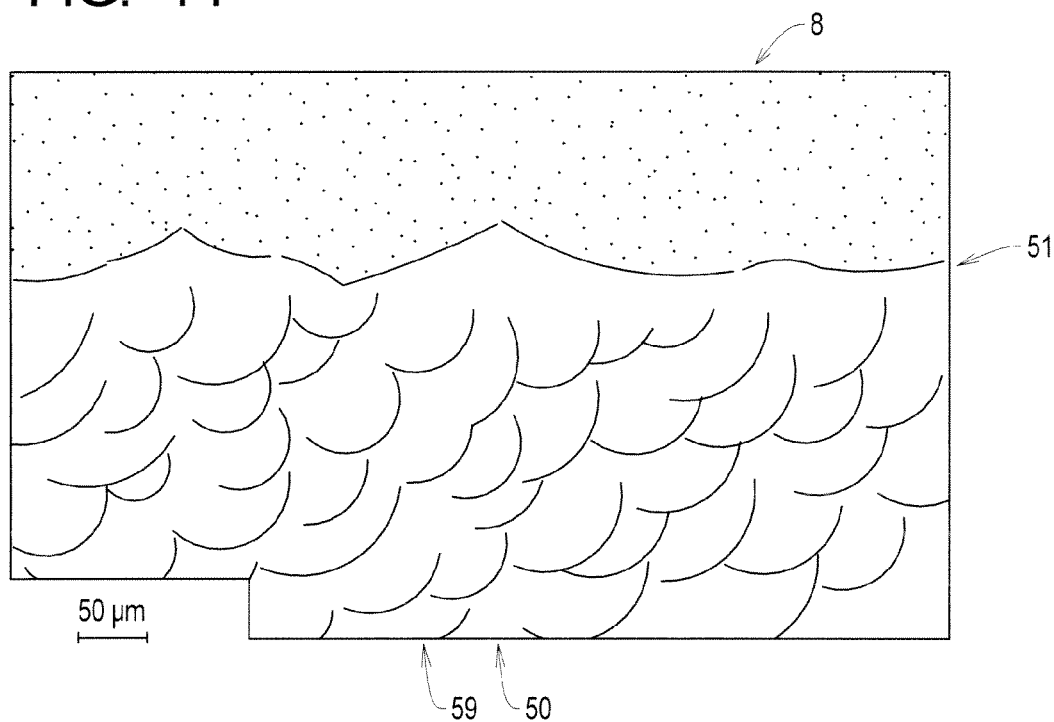
FIG. 14 is a view in transverse section to a smaller scale of the interface area of a laser deposit in accordance with the invention.

The bond between the cladding and the gum material 20 in FIG. 3 is very strong, as it is achieved by surface melting of the substrate. This is a metallurgical bond which makes the cladding very strongly adherent. The obtained surface is homogeneous, non-porous and produces only a small dilution of the substrate. These features are shown in FIG. 14, which shows a regular distribution of the grains 59 of tungsten carbide in the metal matrix 50 and a thin layer 51 bonding the metal matrix to the gum region 20.

The grains of tungsten carbide 59 are not affected by the laser beam, the present method differing in this respect from plasma sputtering. The grains therefore retain all their mechanical properties, and in particular their hardness is not reduced. This has the advantage that an abrasion resistant material based on generally spherical tungsten carbide grains can be used.

The very high rates of solidification obtained by virtue of the highly localized heat treatment produce a very fine microstructure within the matrix, and consequently excellent mechanical properties. In particular, the metal matrix in one form is based on nickel and chromium has hardness less than the hardened elements contained therein. Of course any type of material to hold the carbide particles (hardened elements) can be employed. Nickel is a preferred element because of its tough and ductile and cooperates with the spherical carbide particles without stress risers. In other words the matrix is soft compared to hardened elements such as tungsten carbide spherical particles. By having the cutter ring 10 preheated to 350 to 650° F. the hardness of the heat affected zone (HAZ) directly under the cladding is about 43 to 47 Rockwell hardness. The preheating prior to application of the laser cladding provides more uniform slow cooling. The goal is to reduce rate of cooling to prevent the HAZ brittleness. It is undesirable to form martensite in the HAZ which is brittle and prone to crack formation. Following the laser cladded process, the cutter ring, inserts, and hardened cladded layer are all cooled by being buried in vermiculite or sand or other slow cooling media so if it was room temperature that surface may crack or the heat affected zone would be fixed, so the preheating to 650° F. prevents a hardened heat affected zone right adjacent to the hardened layer. Because the hardened layer has insulating properties, it is advantageous to have the ring preheated so the thermal mass of the ring does not absorb the intense heat from the laser whereby causing a temperature gradient and undesirable metallurgical effects of the HAZ. Of course the pre heating could be higher than 650° F. if precautions are taken so the cutting elements do not fall out during cladding. In fact the heating could go up to 900° F. (or the temperature limit of the cutting elements before undesirable metallurgical changes take place) if such provisions are taken.

It should be noted that the coefficient of thermal expansion for the hardened layer is somewhat less than steel which generally comprises the gum region 20 of the cutter ring 12. The preheating of the cutter ring 12 may have desirable effects of reducing internal stress between the gum region and the hardened layer. With steel as the underlying gum region having a higher thermal expansion coefficient, when the unit cools, the center gum region will contract more than the hardface layer thereby having slight compressive annular stress in this hardface region. Thus providing a higher circumferential compressive stress. This is indicated by present analysis and this surface compressive stress is thought to be desirable for reducing possible tension stress which causes the cracks.

When the cladding is conducted on an already heat treated surface at Rockwell 42 (32-52 in the broader range) and then preheated, it does not crack after the cladding is applied on a drilling application. The forces in application are sufficient to start a crack in the heat affective zone and spread throughout the whole ring if the hardness of the gum region is too high. It has been found that if the gum material is too hard the material forms propagating cracks when the cutters are in use in the rigorous cutting environment. If the gum material 20 is too soft, or unprotected, the abrasive cutting environment erodes the gum material 20 and the cutting elements 18 are forcefully removed or the cladded surface cracks because the underlying substrate of the ring 12 has too much give and does not provide a sufficient hard foundation.

It should be noted that the alloy powder can be directly inserted in the laser beam as the laser passes the cutter ring perimeter surface. Alternatively, the alloy powder can be pre-applied, having the laser pass thereover. The Rockwell hardness of the cutting elements 18 is likely 20 to 30 (or 20 to 40 and above higher in a broader range) more than the surrounding gum substrate area. Rockwell hardness for some cutting tools can be rated in the seventies. Such cutting elements such as nitrided steels are at generally known to have an 80 Rockwell hardness rating so there is a generally broad range of 20 units greater Rockwell hardness from the cutters to the gum region and in some form 30 and above to 40 and above units. It should be noted that there could be a multirow cutter inserts adapted to engage the Earth in a cutting operation.

It should be noted that the gum region is traditionally a Rockwell hardness of 42 to have maximum abrasive wear resistance; however, given now that the cladding operation provides abrasive resistance, the interior gum region can be of a softer metal such as 32 Rockwell (less than 36 in one form) hardness which is very desirable to machine and work with. Present analysis indicates that the Young's modulus of the steel is approximately the same at a lower hardness whereby the deflection of the gum region is similar given a compressive stress. Therefore, the hardened layer has a sufficient foundation to compress upon so there is a reduced chance of cracking.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A method of treating a cutter ring, the method comprising:
   a) preheating the ring to at least 350° F.
   b) identifying a gum region positioned in the outer perimeter portion of the cutter ring,
   c) employing laser cladding to the gum region adjacent to cutting elements,
   d) whereas the cutting elements have a hardness higher than that of the surrounding gum region adjacent thereto and the heat transfer to the cutting elements from the laser cladding process is insufficient to materially alter the hardness of said cutting elements and the gum region is more resistant to erosive wear.

2. The method as recited in claim 1 whereby the cladding process is configured to apply a cladding material at a thickness greater than 0.030 of an inch region in perimeter portion of the cutter ring.

3. The method as recited in claim 1 whereby the heat transfer to the cutting elements does not raise the temperature of the cutting elements above 900° F.

4. The method as recited in claim 1 whereby the cutting elements are comprised of a tungsten carbide material.

5. The method as recited in claim 1 whereby a distance of a laser beam in the laser cladding process to the gum region is adjusted to a consistent width during application on the gum region.

6. A method of treating a cutter ring, the method comprising:
   a) providing a cutter ring that is heat treated with a circumferential region defining a plurality of cavities adapted to receive cutting elements,
   b) inserting cutting elements into the cavity regions,
   c) pre heating the cutter ring by heating the cutter ring to approximately 350° F.-650° F.,
   d) engaging a laser cladding process whereby an alloy powder is applied to a cutter ring outer perimeter surface adjacent to the cutting elements.

7. The method as recited in claim 6 where the Rockwell hardness of the cutter ring is between 32 and 44 when forming the plurality of cavities in the circumferential region.

8. The method as recited in claim 7 whereby the cutting elements are press fit into the cavity regions.

9. The method as recited in claim 6 whereby the alloy powder is introduced into the laser as it passes along the cutter ring perimeter surface.

10. The method as recited in claim 6 whereby the alloy powder is positioned on the cutter ring perimeter surface and the laser transfers heat thereto.

11. The method as recited in claim 6 whereby the cutting elements are made of tungsten carbide.

12. The method as recited in claim 6 whereby the material immediately surrounding the cutting elements in the cutter ring is defined as a gum region having a hardness at least 20 Rockwell units lower than the cutting elements.

13. The method as recited in claim 12 whereby the Rockwell hardness of the laser cladded layer on the cutter ring perimeter surface is at least 20 Rockwell hardness higher than the cutter ring.

14. The method as recited in claim 12 whereby following the heat treating step has a Rockwell hardness between 40-47.

15. The method as recited in claim 12 whereby following the heat treating step, the gum region has a Rockwell hardness of between 30-40.

16. A cutter ring having a perimeter region with a plurality of radially extending cavities with cutting elements fixedly positioned in said cavities, the ring having a gum region engaging said cutting elements, the gum region having a surface region, a hardened layer cladded to the surface region where the hardened layer is cladded to the surface region when the cutter ring is preheated above 350° F. and heat is applied to an alloy powder to form the hardened layer whereby the cutting elements are not effected by the heat is applied to an alloy powder and the metallurgical hardness properties of the cutting elements is preserved whereby hardened elements of the hardened layer and the cutting elements have a Rockwell hardness at least 20 units greater than the gum region.

17. The cutter ring as recited in claim 16 where the temperature of the cutting elements during the heat transfer to the alloy powder does not increase above 900° F.

18. The cutter ring as recited in claim 16 where the Rockwell hardness of the cutting elements in the hardened layer is at least 30 units greater than the gum region.

19. The cutter ring as recited in claim 18 where the surface region is comprised of a nickel matrix composition mixed with a tungsten carbide material.

20. The cutter ring as recited in claim 16 where the hardened layer is not more than 1/8 of an inch in thickness.

21. The cutter ring as recited in claim 19 where the Rockwell hardness of the cutter ring is not more than 44 when forming the plurality of radially extending cavities in the perimeter region.

22. The cutter ring as recited in claim 19 where the Rockwell hardness of the cutter ring is less than 36.

23. The cutter ring as recited in claim 19 where the cutting elements are placed in the radially extending cavities after the hardened layer is formed.

24. The cutter ring as recited in claim 19 where the cutting elements are placed in the radially extending cavities prior to the application of alloy powder to form the hardened layer.

* * * * *